Feb. 7, 1967 T. T. SZAJNER ETAL 3,302,482
VEHICLE BRAKE CABLE TENSIONING AND RELEASING MECHANISM
Filed April 1, 1964 2 Sheets-Sheet 1

INVENTORS
Tadeusz T. Szajner
John B. Swetka
BY

O. D. McGrew
ATTORNEY

INVENTORS
Tadeusz T. Szajner
John B. Swetka
BY
O.D. McKrow
ATTORNEY

United States Patent Office 3,302,482
Patented Feb. 7, 1967

3,302,482
VEHICLE BRAKE CABLE TENSIONING AND
RELEASING MECHANISM
Tadeusz T. Szajner, Royal Oak, and John B. Swetka, Warren, Mich., assignors to General Motors Corporation, Detroit, Mich., a corporation of Delaware
Filed Apr. 1, 1964, Ser. No. 356,567
3 Claims. (Cl. 74—517)

The invention relates to a parking and emergency brake actuating and release mechanism and to installation of such a mechanism in a vehicle.

At one time in the automotive industry a hand or foot actuated emergency brake was provided which was actuated by means of long handles and cams which acted to move the brake shoes into engagement with the friction surfaces. Specialized vehicle body and chassis construction has been developed so that the mounting of the brake actuating lever in some areas may not permit the transmission of reaction forces to the body and frame which would result in heavier brake actuated forces. In recent years a class of sports car type of vehicles has been developed wherein the transmission tunnel or console cover is of relatively light material, while sufficient for decorative and equipment covering purposes, is too light to absorb heavy brake applying and holding forces which would be applied if the auxiliary brake actuating lever were mounted there. It has also become common to provide a relatively short brake actuating lever positioned to one side of the driver to arrange for hand actuation. This may result in a small lever ratio and contribute to limitations on the amount of braking force obtainable. This type of arrangement is exemplified in sport cars, and also in so-called custom cars provided with bucket seats and a tunnel console from which the parking brake lever extends.

It is now proposed to provide a braking system having the advantages to which the public has become accustomed, readily adapted to current styling techniques and vehicle interior materials, and at the same time providing a much greater braking force by means of which the vehicle may be brought to a complete stop within an appreciably shorter distance than many other secondary braking systems now provide. The system embodying the invention provides for a reasonable arcuate stroke of the actuating lever and provides sufficient mechanical advantage to fully apply through mechanical force the vehicle service brakes, or at least part of them, or suitable auxiliary brakes, so that they may be operated quickly, with a minimum of input force requirement, while at the same time maintaining adequate vehicle control. The mechanism is especially constructed and arranged to transmit the brake application reaction forces to a sufficiently strong portion of the vehicle, such as a portion of the frame, without requiring the force to act upon portions of the vehicle body which would otherwise have to be designed to take such force loads.

These advantages are accomplished by providing a brake cable tensioning arrangement which will tension and move a brake actuating cable through a distance to fully apply the brakes through an advantageous ratio on the order of 8:1. Different mechanical ratios may be utilized; however, it has been found that a short hand actuated lever can be provided within the various vehicle design limitations which will perform in a fully satisfactory manner utilizing such a ratio. The mechanism preferably employed involves a rolling track type of input member which moves on a take-up or reaction cable and operates by virtue of its movement to tension the brake apply cable. The brake apply cable is led around and through a pulley and guide arrangement mounted so that the tensioning forces react on the pulley portion thereof and with the reaction forces from take-up cable in such a manner as to ultimately distribute the reaction forces generally axially along the guide member to a vehicle frame member positioned below the brake actuating mechanism. A suitable portion of the vehicle body is provided which encloses the brake actuated mechanism. In the installation illustrated and described below in greater detail, this portion of the body is a tunnel cover which provides a housing for the transmission control lever and for the vehicle driveshaft. The mechanism is constructed and arranged to be readily released by the vehicle operator.

Figure 1:
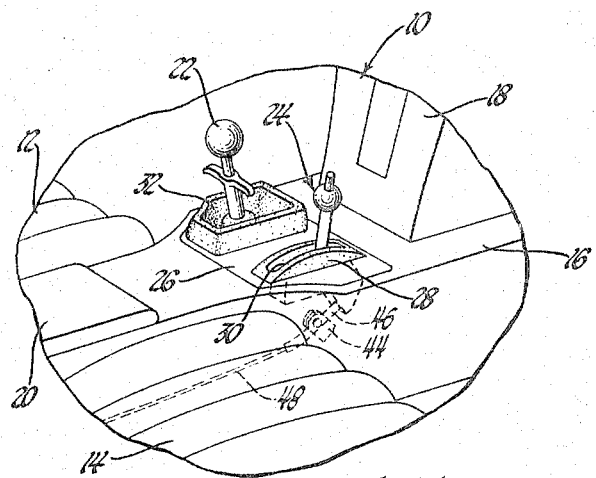
FIGURE 1 is an isometric view of a portion of a vehicle having installed therein mechanism embodying the invention.

The vehicle 10 is illustrated as having bucket seats 12 and 14 separated by the tunnel cover 16. The tunnel cover is a relatively light portion of the vehicle body and may include a console 18 and a storage compartment 20. This design is often provided in vehicles of the type known as sport cars, although it is not limited to such vehicle types. A transmission control lever 22 is provided and extends generally vertically from out of the tunnel cover 16 so that it is conveniently positioned for the driver to operate while sitting in the driver's seat 12. A parking and emergency brake lever 24 also extends upwardly out of the tunnel cover 16. A closure member 26 is provided with a slotted closure section 28 which provides a brake lever operating slot 30 through which lever 24 extends. A generally similar closure section 32, of suitable shape to permit operation of the transmission control lever 22, is provided in the closure member 26 for lever 22.

Figure 2:
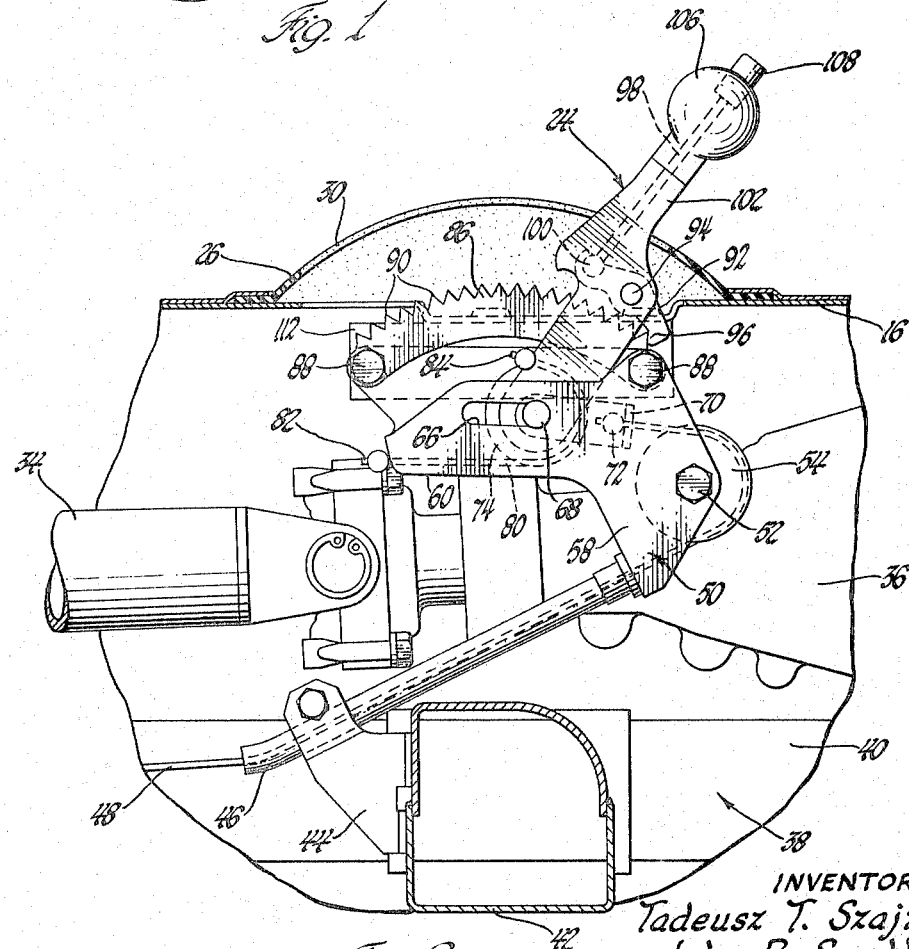
FIGURE 2 is an elevation view of mechanism embodying the invention, with parts broken away and in section, and illustrating the mechanism in the brake release position.
Figure 3:
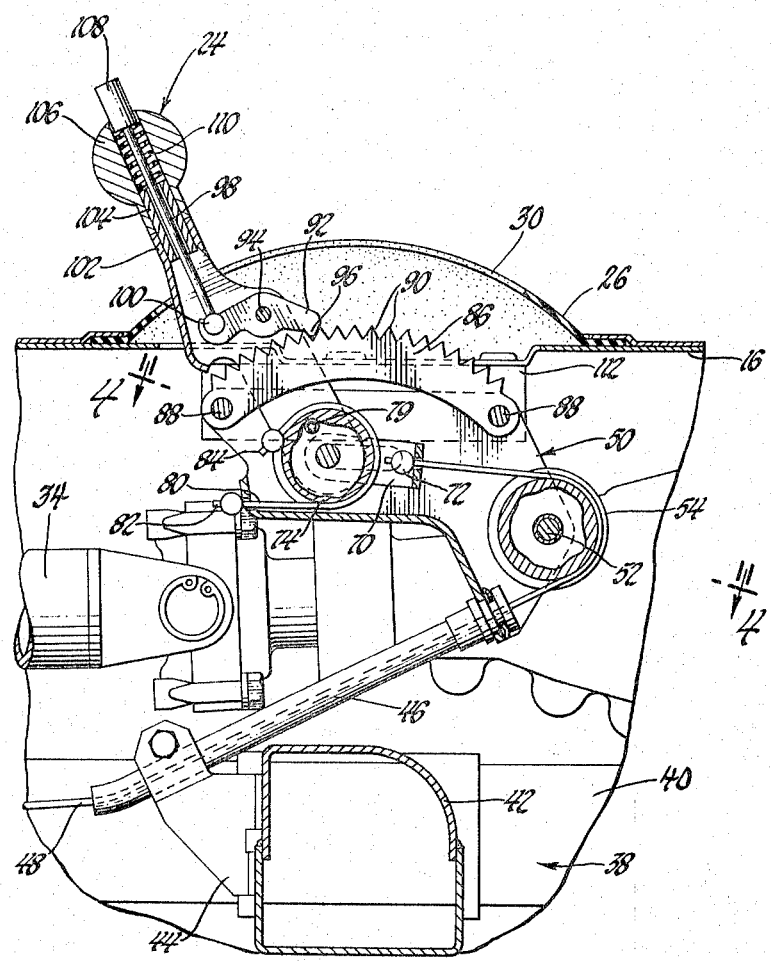
FIGURE 3 is generally similar to FIGURE 2, has parts broken away and in section, and illustrates the mechanism in the brake apply position.
Figure 4:
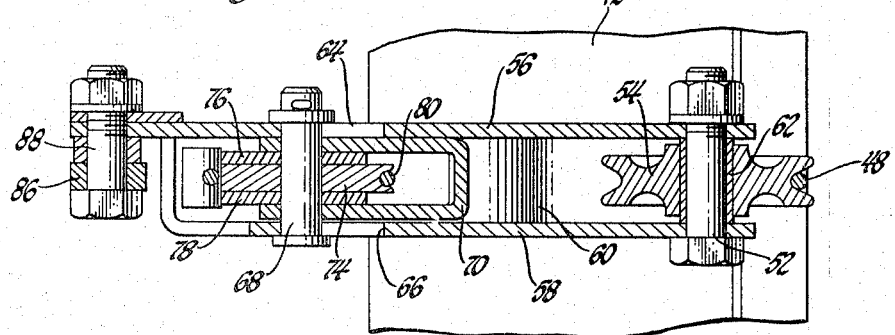
FIGURE 4 is a cross section view of the mechanism, with parts broken away and in section, and taken in the direction of arrows 4—4 of FIGURE 3.

As is better shown in FIGURES 2 and 3, the vehicle driveshaft 34 may extend through the area covered by the tunnel cover 16. The transmission tailshaft housing 36 may also extend into a portion of the space covered by the tunnel cover 16. The vehicle includes a frame 38 and is illustrated as having a frame side rail 40 underneath the vehicle body and a frame cross member 42 connected to the side rail 40 and another similar side rail. Depending upon the particular vehicle frame and body design, the frame side rails may pass through a portion of the tunnel covered by cover 16, particularly if the frame is of an X design.

The brake mechanism is mounted so that it transmits forces to the frame cross member 42. This is accomplished by providing a bracket 44 secured to the cross member and having a force transmitting guide member 46 secured thereto. The guide member may be in the form of a tube, as illustrated, and the brake cable 48 may extend through it so that it is guided to a position within the tunnel from which it may extend to at least a portion of the vehicle brake system. In the vehicle illustrated, and as is common practice, the manual brake system actuates the rear vehicle brakes by tensioning the cable 48.

Guide member 46 extends upwardly and forwardly over the frame cross member 42 and has a mounting bracket 50 attached to its upper end. A pulley axle 52 is secured to bracket 50 and rotatably mounts an idler pulley 54 over which cable 48 passes. Axle 52 is located relative to the upper end of the guide member 46 so that the cable 48 is provided with a fairlead, while at the same time forces exerted on the axle 52 during brake actuation are transmitted to the bracket 50 at a point substantially in line with the axis of the guide member 46. Thus the guide member 46 transmits the brake apply reaction forces substantially axially along it to the bracket 44 and then to the frame cross member 42.

Bracket 50 is provided with a brake force multiplying mechanism mounted generally above the guide member 46. For this purpose, and to mount pulley axle 52, bracket 50 is provided with spaced flanges 56 and 58 joined by the bracket base 60. This spacing may be maintained by suitable bearings and spacers surrounding bolts or pins extending through both bracket flanges. A typical such suitable bearing and spacer 62 is provided around the axle 52 for the idler pulley 54. Bracket flanges 56 and 58 are provided with aligned slots 64 and 66 which are in substantial longitudinal alignment with lines parallel to a tangent line extending from the cable-receiving periphery of idler pulley 54. A pin 68 extends through slots 64 and 66. A clevis 70 is pivotally attached to the pin 68 and extends toward pulley 54. The end of cable 48 is attached to clevis 70 by the ball type fastener 72 so that the portion of cable 48 between pulley 54 and clevis 70 lies along the tangent line extending from the pulley. Also between the bracket flanges 56 and 58, an input pulley 74 is rotatably mounted on pin 68. Likewise, the lever 24 is formed with spaced flanges 76 and 78 between which input pulley 74 is received. A pin 79 may extend through lever flanges 76 and 78 and pulley 74 to hold lever 24 and pulley 74 in relatively non-rotatable relation. Thus lever 24 is also pivotally mounted on pin 68. A relatively short reaction or take-up cable 80 has one cable end 82 held by a turned up portion of the bracket base 60. Cable 80 is led around input pulley 74 and has the other cable end 84 retained on brake lever 24. Thus cable 80 passes underneath the pulley 74 and around the portion of the pulley facing the idler pulley 54.

An arcuate rack 86 is secured by bolts 88 at either end to the bracket flanges 56 and 58 and is received between the lever flanges 76 and 78. The rack is provided with suitable teeth 90 on its outer arcuate surface. A toothed pawl 92 is pivotally mounted by pin 94 to the lever flanges 76 and 78 so that its tooth 96 is engageable with two adjacent teeth 90 of the rack. Tooth 96 is provided on one end of pawl 92, and a push rod 98 is pivotally attached at pivot 100 to the other pawl end. Rod 98 extends upwardly through the handle portion 102 of lever 24. A rod guide and spring seat 104 is secured within handle 102, and rod 98 extends through it. The upper end of handle 102 may be provided with a grip knob 106. Push rod 98 also extends through a passage in the grip knob 106 and terminates in a button 108 extending above the knob. The compression spring 110 is provided between the inner end of button 108 and spring seat 104 so that it urges the button and the push rod 98 upwardly. This in turn urges the pawl 92 clockwise and the tooth 96 into full engaging relation with two adjacent teeth 90 on the rack. The arrangement is such that when tooth 96 is so engaged, lever 24 is prevented from moving clockwise as seen in FIGURES 2 and 3. However, a ratcheting effect takes place when lever 24 is moved counterclockwise from the position of FIGURE 2 to the position shown in FIGURE 3.

The closure member 26 is fastened to the tunnel cover 16 so that it covers the arcuate rack 86 and the handle portion 102 of the lever is in position passing through the slot 30. This provides a clean installation and also protects the brake mechanism.

When the brake is to be applied from the position shown in FIGURE 2, the operator grips the lever 24 about knob 106 and handle 102, then exerts a force on the lever moving it counterclockwise. Pawl 92 ratchets over rack 86. Cable end 84 of reaction cable 80 is also moved counterclockwise, thus rolling pulley 74 on the lower portion of the cable and causing pin 68 to move to the left in slots 64 and 66. The distance from the center of manual application on the handle, which may be considered to be approximately at the enter of knob 106, to the axis of pin 68, in relation to the diameter of the input pulley 74, may be any suitable value and has been found to be very satisfactory when provided at a 8:1 ratio. This permits the use of a short lever 24 extending above tunnel cover 16. Clevis 70 is moved to the left a relatively short distance compared to movement of knob 106 and the force exerted on the lever 24 is multiplied accordingly. Therefore, in the ratio given, an eight inch rearward arcuate movement of knob 106 results in approximately a one inch rearward movement of clevis 70. Since the cable 48 is attached to clevis 70, it is tensioned by this movement. The reaction forces occuring in the mechanism result in a force being applied by the reaction cable 80 against bracket 50 which is substantially in line with and toward the axle 52. Likewise, the tensioning effect on cable 48 applies a force to pulley 54, and then to axle 52, which is transmitted to the bracket 50 substantially axially of guide member 46. These reaction forces are then transmitted through the guide member to the bracket 44 and the frame cross member 42. None of the reaction forces are required to be transmitted to the tunnel cover 16. A light guide bracket 112 may be provided between a suitable portion of bracket 50 and the tunnel cover 16, if desired, but this bracket is not required to transmit any of the reaction force of the brake applying mechanisms.

In order to release the brake, the operator grasps the handle 102 and with h is thumb pushes button 108 downwardly. This pivots pawl tooth 96 out of engagement with rack teeth 90. This may be readily accomplished when a slight additional counterclockwise force is exerted on lever 24 which reduces the pressures on the engaged teeth. The operator holds button 108 down to keep the pawl disengaged and controllably releases the tension on cable 48 by allowing the lever to move to the right a desired amount. If he desires to fully release the braking system, he moves it to the position shown in FIGURE 2.

A brake actuating mechanism has been provided which gives a sufficiently high brake force multiplying ratio to apply the vehicle brakes so as to bring the vehicle to a quick and complete stop. Experience with vehicles having such a system installed and utilizing the 8:1 ratio of force multiplication has shown that a vehicle may be stopped in a most expeditious manner. For example, a vehicle traveling at 30 m.p.h. had the braking system applied only by operation of lever 24 and the brakes have been actuated with sufficient force to completely lock the rear wheels while the vehicle is operating on dry pavement, all obtained within the full stroke of lever 24. Thus there is sufficient braking force available to provide a true emergency brake as well as a parking brake. The system transmits no brake reaction force to the tunnel cover portion of the vehicle body, but transmits the forces directly to the vehicle frame, which is sufficiently strong to absorb these forces without any likelihood of damage.

We claim:

1. An emergency and parking brake control assembly for a vehicle having a frame and a tunnel cover within which said assembly is to be mounted, said assembly comprising, a bracket, a handle mounted for movement on said bracket, force multiplier means having said handle as a force input member and an input force reaction member connected to a portion of said bracket and a tensionable take-up cable as an output member, an idler pulley rotatably mounted on an axle secured to said bracket and receiving said take-up cable to change the direction of said cable, cable guide means secured to said bracket and adapted to be secured to the vehicle frame for mounting said bracket to the frame in force transmitting relation therebetween, means for guidably securing said bracket to said tunnel cover adjacent said handle, said bracket reaction member portion and said idler pulley axle and said force transmitting cable guide means being positioned to transmit substantially all of the brake reaction forces generated when tensioning said cable to said guide means for transmission to said frame member.

2. In a vehicle having a frame and a body secured thereto, brake apply and release mechanism comprising, a brake actuating and releasing cable, means connected with said cable for manually tensioning and releasing the same, a mounting system including a cable guide member receiving said cable therethrough and operatively secured to said frame and extending upwardly therefrom, a mounting bracket secured to said guide member and having said manual tensioning and releasing means mounted thereon to provide tensioning reaction force transmitting means for conducting the tensioning reaction forces to said frame through said guide member, said manual tensioning and releasing means having an operating member extending through an opening provided in a portion of said body secured in spaced relation above said frame adjacent the point where said guide member is secured to said frame, and guide bracket means holding said manual tensioning and releasing means in guided relation to said body.

3. The mechanism of claim 2, said cable guide member being formed as a tube and mounted to transmit tensioning reaction forces substantially axially thereof between said mounting bracket and said frame.

References Cited by the Examiner
UNITED STATES PATENTS

| | | | |
|---|---|---|---|
| 1,386,213 | 8/1921 | Trainor | 74—535 X |
| 1,718,258 | 6/1929 | Schmidt | 74—502 |
| 2,190,087 | 2/1940 | Snell | 74—502 X |
| 2,507,997 | 5/1950 | Roedding et al. | 74—517 |
| 2,529,447 | 11/1950 | Bodinaux et al. | 74—517 X |
| 2,672,057 | 3/1954 | Bratz | 74—517 X |
| 2,724,982 | 11/1955 | Sanft | 74—517 X |
| 2,869,394 | 1/1959 | Koehl | 74—517 X |
| 2,986,046 | 5/1961 | Vigmostad | 74—540 |

FRED C. MATTERN, JR., *Primary Examiner.*

C. F. GREEN, *Assistant Examiner.*